Patented June 10, 1941

2,245,104

UNITED STATES PATENT OFFICE 2,245,104

METHOD OF MANUFACTURING COATED PIGMENTS

Paul W. Greubel, Astoria, Long Island, N. Y., assignor to Interchemical Corporation, New York, N. Y., a corporation of Ohio No Drawing. Application October 29, 1937, Serial No. 171,645

6 Claims. (Cl. 134—58)

This invention relates to pigments, and has special reference to a method of producing pigments which are readily dispersible in oily or oleoresinous materials, and to the new pigments so produced. More particularly, it contemplates coating the individual pigment particles with a thin film of non-volatile, non-oxidizing hydrocarbons whereby readily dispersible dry powdered pigment is secured.

When chemical dry colors or pigments are incorporated in a medium such as drying oils or resin solutions, it is necessary to resort to some vigorous mechanical means in order that proper and complete dispersion of the pigment will result, and the mass thereby becomes smooth and uniform. Unless the pigment employed is so dispersed, the product is valueless for use as a printing ink or paint. At the present time there are several methods for accomplishing thorough dispersion, the most widely used being grinding operations on buhrstone, roller or ball mills. There is also an operation known in the trade as "flushing," in which the water-wet pigment is mixed with oil and wetted thereby, the resultant mass coagulated and subsequently treated with heat and vacuum or extended milling in order to remove the residual water. There are also methods which provide for vigorous agitation and/or malaxation of a concentrated pigment-vehicle combination. The internal friction developed effectively produces satisfactory dispersion. All of the above cited methods necessarily involve extended and power-consuming operations, and it is the purpose of the present invention to provide pigments which are readily dispersible without resorting to vigorous mechanical attrition.

Pigments have heretofore been coated with wetting agents to render them more readily dispersible, without extended milling; but such agents have the disadvantage generally of being water-miscible, so that they affect certain desirable properties of the paint or ink in which they are used. Other agents, such as the fatty acids (which are generally used with basic pigments so as to form fatty acid soaps with the pigments), are not sufficiently good dispersing agents to insure thorough wetting. In addition, many of them change in character due to oxidation, turning rancid.

I have discovered that excellent dispersibility can be obtained with pigments by coating them with a layer of a non-volatile aliphatic hydrocarbon, exemplified by what is known as white Russian mineral oil, pale paraffin oil and the like, and that such a layer can be applied to pigments without adding any operations to the conventional method of making pigments, by adding the hydrocarbon to the washed pigment pulp, before drying, in the form of an emulsion, using a wetting or emulsifying agent which is volatile or is destroyed by the heat used in drying the pigment. This method can likewise be used in applying layers of other water-immiscible, hydrophobic materials, such as fatty oils and the like, to pigments.

In the process of producing dry colors at the present time, the steps are essentially the precipitation of the color, washing, decantation, filter pressing, drying and pulverizing. The present invention does not propose to alter the manner nor sequence of any of these operations, but consists of adding to the pigment, preferably to the vat or tank after the pigment has been precipitated and washed, as by decantation, an agent whose function it is to place on the surface of each pigment particle a layer of a non-volatile, substantially saturated hydrocarbon. The material which is added is preferably composed of a solution of a salt-like compound or soap formed by sufficiently volatile alkyl and/or aryl amines such as monoamylamine, monobutylamine, ammonium hydroxide, pyridine, diamylamine, triethylamine, and aniline; and acids of carboxylic, sulphonic or other structure such as oleic, ricinoleic, naphthenic and naphthalene sulphonic acid, dissolved in a non-volatile, saturated aliphatic hydrocarbon exemplified by what is known as Russian mineral oil, light paraffine oil or the like. The resultant reagent is then dispersed in water, in which form it is ready to be added to the vat. It is important, however, and essential of the present invention, to employ an oil which is neither volatile nor subject to oxidation and to keep the percentage of such reagent considerably below a point where attrition of the final pigment could cause coagulation and thereby form a paste. If the latter essential is not observed, it can readily be seen that the result would be coagulation or "gumming" in the pulverizing machine. This proportion ranges from 1 to 25% by weight of pigment, which varies with the specific gravity and specific surface of each pigment. After the reagent has been added to the vat resort may be had, if desired, to the addition of a small amount of an electrolyte, preferably a salt of a divalent metal to hasten the settling operation. The method thenceforth is identical with current procedure, which includes the filter press, drying and pulverizing operations.

When the resultant press cake is put into the drying oven, the basic component of the wetting agent or soap, being volatile, is discharged as a vapor, and consequently no such material remains in the pigment as might cause emulsification or tinting of a lithographic plate. Furthermore, the percentage of aliphatic hydrocarbon can be low enough so as not to be a proportion factor in the formula for the ink or paint produced. The pigment has apparent characteristics identical with pigments not so treated as far as their powderlike appearance is concerned. There is, however, around each particle of pigment a film of the hydrocarbon which renders agglomeration impossible, and this film furthermore, being miscible with the vehicle employed and itself having already wetted the pigment, permits such pigment to be readily incorporated in the vehicle and dispersed without resorting to vigorous mechanical attrition.

Typical examples of my invention are as follows:

Example I

To 600 lbs. of a 10.8% suspension of chrome yellow in water is added, with constant stirring, 17.8 lbs. of an emulsion containing 0.4 lb. of monoamylamine oleate and 3.8 lbs. of paraffin oil. This mixture is continuously stirred for 5 or 10 minutes, after which the pigment is allowed to settle, filter-pressed, dried and pulverized. The resulting product will be found to disperse satisfactorily in a paint or printing ink vehicle merely upon mixing, without the necessity of a grinding operation.

Example II

To 444 lbs. of a 2.14% suspension of barium lithol in H2O is added, with constant stirring, 8 lbs. of an emulsion containing 0.2 lb. of monoamylamine oleate and 1.8 lbs. of paraffin oil. The procedure thenceforth is identical with that followed in Example I and the resultant pigment will be found to possess the same characteristic of easy dispersion.

Example III

To 500 lbs. of a 5% suspension of eosine toner in H2O is added, with constant stirring, 10.4 lbs. of an emulsion containing .42 lb. of monoamylamine ricinoleate and 3.74 lbs. of paraffin oil. The procedure is thenceforth identical with that followed in the preceding examples.

While I have shown but a few wetting agents, any material which can be volatilized by the heat of the drier, or any wetting agent such as the soaps shown which lose their wetting power due to decomposition and volatilization of the activating ingredient, is satisfactory for use in the practice of my invention.

The hydrocarbon used for forming the coating on the pigment should preferably be aliphatic and non-oxidizing, so that it will remain stable on storage even when exposed in the thin films in which it is present in the pigment particles. Obviously, the hydrocarbon must be sufficiently non-volatile in the driers that it will remain on the pigment.

The oil and wetting agent can be added to the pigment at any time after the pigment is struck and washed and before it is dried, but addition before filtration is preferred because such addition adds no extra steps to the process.

The use of my improved process and pigments makes for ready dispersibility in oily and oleoresinous vehicles, eliminating the excessive milling required with prior art pigments. Since there is no wetting agent retained on the pigment, no undesirable hydrophilic characteristics are introduced into the composition, while the resistance to oxidation and evaporation makes the pigment extremely stable under storage conditions. The presence of the hydrocarbon likewise repels moisture from adsorbing onto the pigment during storage. With all these advantages, the cost is nominal, since the agents used are cheap and no additional equipment is needed in the pigment plant.

What I claim is:

1. The process of preparing a pigment powder which is readily dispersible in an organic film forming vehicle, which comprises mixing with a pigment water pulp sufficient of a hydrophobic coating material to coat the pigment particles, but insufficient to cause them to coalesce upon removal of the water, the coating material being dispersed through the pulp by an aqueous solution of a wetting agent unstable at drying temperatures, and thereafter evaporating water from the pigment pulp, and simultaneously removing the wetting agent as such.

2. The process of preparing a pigment powder which is readily dispersible in an organic film forming vehicle, which comprises mixing with a pigment water pulp sufficient of a hydrophobic coating material to coat the pigment particles, but insufficient to cause them to coalesce upon removal of the water, the coating material being dispersed in an aqueous solution of a wetting agent at least a portion of which is volatile at temperatures necessary to evaporate the water of the pulp, and thereafter simultaneously evaporating the water and the volatile portion of the wetting agent to produce a coated pigment substantially free of hydrophilic wetting agents.

3. The process of claim 2, in which the wetting agent is a soap of a volatile amine, and the amine is volatilized during the removal of the water.

4. The process of claim 2, in which the hydrophobic coating material is a non-volatile aliphatic hydrocarbon.

5. The process of claim 2, in which the hydrophobic coating material is a non-volatile aliphatic hydrocarbon, the wetting agent is a soap of a volatile amine, and the amine is volatilized during the removal of the water.

6. The process of claim 2, in which the hydrophobic coating material is a non-volatile aliphatic hydrocarbon, and the wetting agent is a monoamylamine soap.

PAUL W. GREUBEL.